United States Patent
Nagasawa et al.

(10) Patent No.: US 10,938,034 B2
(45) Date of Patent: Mar. 2, 2021

(54) BINDER COMPOSITION, BINDER DISPERSION LIQUID, ELECTRODE MIXTURE, ELECTRODE, NON-AQUEOUS ELECTROLYTE SECONDARY BATTERY, AND METHOD FOR PRODUCING BINDER COMPOSITION

(71) Applicant: Kureha Corporation, Tokyo (JP)

(72) Inventors: Yoshiyuki Nagasawa, Tokyo (JP); Tamito Igarashi, Tokyo (JP)

(73) Assignee: KUREHA CORPORATION, Tokyo (JP)

( * ) Notice: Subject to any disclaimer, the term of this patent is extended or adjusted under 35 U.S.C. 154(b) by 0 days.

(21) Appl. No.: 16/069,197

(22) PCT Filed: Nov. 14, 2016

(86) PCT No.: PCT/JP2016/083631
§ 371 (c)(1),
(2) Date: Jul. 11, 2018

(87) PCT Pub. No.: WO2017/126201
PCT Pub. Date: Jul. 27, 2017

(65) Prior Publication Data
US 2018/0358626 A1 Dec. 13, 2018

(30) Foreign Application Priority Data
Jan. 19, 2016 (JP) .............................. JP2016-008310

(51) Int. Cl.
| | | |
|---|---|---|
| H01M 4/62 | (2006.01) | |
| H01M 4/133 | (2010.01) | |
| H01M 10/0525 | (2010.01) | |
| C08L 27/16 | (2006.01) | |
| H01M 4/13 | (2010.01) | |
| C08F 214/22 | (2006.01) | |
| H01M 4/04 | (2006.01) | |

(52) U.S. Cl.
CPC .......... *H01M 4/623* (2013.01); *C08F 214/22* (2013.01); *C08F 214/222* (2013.01); *C08L 27/16* (2013.01); *H01M 4/13* (2013.01); *H01M 4/133* (2013.01); *H01M 4/62* (2013.01); *C08F 2800/20* (2013.01); *C08F 2810/20* (2013.01); *H01M 4/0404* (2013.01); *H01M 10/0525* (2013.01)

(58) Field of Classification Search
CPC ....... H01M 4/133–623; H01M 10/0525; C08F 214/222
See application file for complete search history.

(56) References Cited

U.S. PATENT DOCUMENTS

| | | | |
|---|---|---|---|
| 3,851,018 A | 11/1974 | Kelly | |
| 2004/0058240 A1 | 3/2004 | Christensen | |
| 2008/0131776 A1* | 6/2008 | Sakuma | ................ H01G 11/38 |
| | | | 429/217 |
| 2011/0159366 A1 | 6/2011 | Nakura | |
| 2014/0039130 A1* | 2/2014 | Murai | ................ C08F 214/184 |
| | | | 525/387 |

FOREIGN PATENT DOCUMENTS

| | | |
|---|---|---|
| CN | 101107281 A | 1/2008 |
| JP | 2003-331823 A | 11/2003 |
| JP | 2006500738 A | 1/2006 |
| JP | 2007231264 A | 9/2007 |
| JP | 2011-258351 A1 | 12/2011 |
| JP | 2013211247 A | 10/2013 |
| JP | 2013254721 A | 12/2013 |
| JP | 2014160651 A | 9/2014 |
| JP | 2015-162384 A | 9/2015 |
| KR | 10-2007-0110006 A | 11/2007 |
| WO | WO 2006/080259 A1 | 8/2006 |
| WO | WO2011001666 A1 | 1/2011 |

OTHER PUBLICATIONS

Extended European Search Report dated Jan. 3, 2019, in European Patent Application No. 16886440.3.
English translation of International Preliminary Report on Patentability and Written Opinion dated Aug. 2, 2018, in PCT/JP2016/083631 (Forms PCT/IB/338, PCT/IB/373, and PCT/ISA/237).
Translation of International Search Report for PCT/JP2016/083631 dated Feb. 7, 2017.
Japanese Office Action, dated Dec. 3, 2019, for Japanese Application No. 2016-008310, with an English translation.
Korean Office Action, dated Feb. 13, 2020, Korean Application No. 10-2018-7019017, along with an English translation.
Japanese Office Action, dated Jun. 9, 2020, for Japanese Application No. 2016-008310, along with an English translation.
Chinese Office Action for Application No. 201680077678.7, dated Jul. 17, 2020 with English language translation.

* cited by examiner

*Primary Examiner* — Osei K Amponsah
(74) *Attorney, Agent, or Firm* — Birch, Stewart, Kolasch & Birch, LLP

(57) ABSTRACT

The present invention provides a binder composition which suppresses a swelling ratio in an electrolyte solution while having sufficient peel strength. The binder composition according to the present invention contains a copolymer including monomer units derived from vinylidene fluoride, a fluorine-containing alkyl vinyl compound, and a crosslinkable monomer; the content of the monomer unit derived from the fluorine-containing alkyl vinyl compound in the copolymer being not less than 2 mass % and less than 10 mass %; and the content of the monomer unit derived from the crosslinkable monomer being less than 5 mass %.

9 Claims, No Drawings

BINDER COMPOSITION, BINDER DISPERSION LIQUID, ELECTRODE MIXTURE, ELECTRODE, NON-AQUEOUS ELECTROLYTE SECONDARY BATTERY, AND METHOD FOR PRODUCING BINDER COMPOSITION

TECHNICAL FIELD

The present invention relates to a binder composition used in the production of a non-aqueous electrolyte secondary battery, in particular, a lithium ion secondary battery, a binder dispersion liquid using the binder composition, an electrode mixture, an electrode, a non-aqueous electrolyte secondary battery using the binder composition, and a method for producing a binder composition.

BACKGROUND ART

In recent years, there have been remarkable developments in electronic technology, and the functionality of miniature mobile devices has become increasingly advanced. Therefore, there has been a demand for the power supplies used in these devices to be smaller and lighter, that is, to have higher energy density. Non-aqueous electrolyte secondary batteries such as lithium-ion secondary batteries are widely used as batteries having high energy density.

From the perspective of global environmental problems and energy conservation, non-aqueous electrolyte secondary batteries are used in hybrid automobiles combining a secondary battery and an engine, electric automobiles having a secondary battery as a power supply, and the like, and applications thereof are expanding.

An electrode for a non-aqueous electrolyte secondary battery has a structure including a current collector and an electrode mixture layer formed on the current collector. The electrode mixture layer is typically formed by applying an electrode mixture containing an electrode active material and a binder composition to the current collector in the form of a slurry dispersed in an appropriate solvent or a dispersion medium to volatilize the solvent or dispersion medium. A vinylidene fluoride polymer such as polyvinylidene fluoride (PVDF) has been primarily used as a binder (binding agent).

However, since the peel strength of a PVDF homopolymer used as a binder is insufficient, there is a problem in that a phenomenon such as the shedding or peeling of the electrode mixture layer of the electrode active material from the current collector is observed.

Therefore, to enhance the peel strength of the binder, copolymers containing monomer components other than vinylidene fluoride (VDF) in addition to VDF have been developed as binder compositions (for example, Patent Documents 1 to 3). Patent Document 1 discloses a negative electrode composition containing PVDF, and describes that a crosslinkable comonomer is used for a binding agent. Patent Document 2 discloses that a fluororesin containing a crosslinkable functional group is used as a binding agent. Patent Document 2 describes that a carboxyl group is particularly preferable as a crosslinkable functional group. Patent Document 3 discloses a positive electrode paste using a vinylidene fluoride/perfluoromethyl vinyl ether/tetrafluoroethylene terpolymer as a binding agent.

CITATION LIST

Patent Literature

Patent Document 1: JP 2006-500738 T (published Jan. 5, 2006)

Patent Document 2: WO 11/001666 (published Dec. 10, 2011)

Patent Document 3: JP 2013-254721 A (published Dec. 19, 2013)

SUMMARY OF INVENTION

Technical Problem

A known copolymer used in a binder composition is a copolymer including vinylidene fluoride (VDF) and hexafluoropropylene (HFP) as monomer units. Sufficient peel strength is achieved with a binder composition using a copolymer of VDF and HFP (copolymers may be notated by separating the components with a "slash (/)" hereafter; for example, a copolymer of VDF and HFP may be notated as "VDF/HFP").

However, VDF/HFP has a problem in that it has a large swelling ratio in an electrolyte solution and is therefore unsuitable for use as a binder composition used in an electrode mixture.

The present invention was conceived in light of the problems described above, and an object of the present invention is to provide a binder composition containing a copolymer including fluorine-containing alkyl vinyl compounds such as VDF and HFP as monomer units, the binder composition exhibiting sufficient peel strength and suppressing the swelling ratio in an electrolyte solution.

Solution to Problem

As a result of conducting diligent research to achieve the object described above, the present inventors discovered that a copolymer including vinylidene fluoride, a fluorine-containing alkyl vinyl compound, and a crosslinkable monomer in specific compounded amounts can solve the above problems, and the present inventors thereby achieved the present invention. The present invention can be described as follows.

To solve the problems described above, the binder composition according to the present invention contains a copolymer including monomer units derived from vinylidene fluoride, a fluorine-containing alkyl vinyl compound, and a crosslinkable monomer; a content of the monomer unit derived from the fluorine-containing alkyl vinyl compound in the copolymer being not less than 2 mass % and less than 10 mass %; and a content of the monomer unit derived from the crosslinkable monomer being less than 5 mass %.

To solve the problems described above, the method for producing a binder composition according to the present invention is a method for producing a binder composition for binding an electrode active material to a current collector; the binder composition containing a copolymer including monomer units derived from vinylidene fluoride, a fluorine-containing alkyl vinyl compound, and a crosslinkable monomer; and the method including producing the copolymer using the fluorine-containing alkyl vinyl compound in an amount of not less than 2 parts by mass and less than 10 parts by mass and the crosslinkable monomer in an amount of less than 5 parts by mass when a total amount of the monomers used in the production of the copolymer is defined as 100 parts by mass.

Advantageous Effects of Invention

With the present invention, a binder composition which suppresses a swelling ratio in an electrolyte solution while enhancing peel strength is provided.

DESCRIPTION OF EMBODIMENTS

An embodiment of the binder composition, binder dispersion liquid, electrode mixture, electrode, non-aqueous electrolyte secondary battery, and production method for a binder composition according to the present invention will be described in detail hereinafter.

Binder Composition

The binder composition according to this embodiment is used to bind an electrode active material to a current collector in a non-aqueous electrolyte secondary battery in which an electrode mixture layer containing the electrode active material is formed on the current collector. The binder composition contains a copolymer including at least a monomer unit derived from VDF (also called a "VDF component" hereafter). This copolymer further includes a monomer unit derived from a fluorine-containing alkyl vinyl compound (also called a "fluorine-containing alkyl vinyl compound component" hereafter) and a monomer unit derived from a crosslinkable monomer (also called a "crosslinkable monomer component" hereafter).

Copolymer

The copolymer according to this embodiment may also include other monomer units as long as it includes a VDF component, a fluorine-containing alkyl vinyl compound component, and a crosslinkable monomer component. Of these, the copolymer is preferably a ternary copolymer containing three types of monomer units including a VDF component, a fluorine-containing alkyl vinyl compound component, and a crosslinkable monomer component.

Here, the content of the VDF component in the copolymer is preferably not less than 50 mass %, more preferably not less than 80 mass %, even more preferably not less than 85 mass %, and most preferably not less than 87 mass %. In addition, the content of the fluorine-containing alkyl vinyl compound component in the copolymer is not less than 2 mass % and less than 10 mass %, more preferably not less than 3 mass % and not greater than 9 mass %, and even more preferably not less than 4 mass % and not greater than 8 mass %. Further, the content of the crosslinkable monomer component in this copolymer is less than 5 mass %, preferably not less than 0.1 mass % and less than 5 mass %, more preferably not less than 0.1 mass % and not greater than 4 mass %, and even more preferably not less than 0.3 mass % and not greater than 3 mass %.

To obtain a copolymer having a ratio of each monomer unit as described above, vinylidene fluoride is preferably used in an amount of not less than 50 parts by mass, more preferably not less than 80 parts by mass, even more preferably not less than 85 parts by mass, and particularly preferably not less than 87 parts by mass at the time of polymerization when the total of all monomer units used as starting materials is defined as 100 parts by mass. Similarly, the fluorine-containing alkyl vinyl compound is preferably used in an amount of not less than 2 parts by mass and less than 10 parts by mass, more preferably not less than 3 parts by mass and not greater than 9 parts by mass, and even more preferably not less than 4 parts by mass and not greater than 8 parts by mass. Similarly, the crosslinkable monomer is preferably used in an amount less than 5 parts by mass, more preferably not less than 0.1 parts by mass and less than 5 parts by mass, even more preferably not less than 0.1 parts by mass and less than 4 parts by mass, and particularly preferably not less than 0.3 parts by mass and less than 3 parts by mass.

Examples of the fluorine-containing alkyl vinyl compound used in the copolymer include but are not limited to vinyl fluoride, trifluoroethylene (TrFE), tetrafluoroethylene (TFE), chlorotrifluoroethylene (CTFE), and hexafluoropropylene (HFP). The fluorine-containing alkyl vinyl compound is preferably hexafluoropropylene, tetrafluoroethylene, or chlorotrifluoroethylene and is more preferably hexafluoropropylene.

Examples of the crosslinkable monomer used in the copolymer include perfluorodivinyl ether (CF$_2$=CF—O—CF=CF$_2$) and perfluoroalkylene divinyl ether.

The perfluoroalkylene divinyl ether is preferably a compound represented by Formula I below.

$$R(O-CF=CF_2)_2 \qquad \text{Formula I}$$

In Formula I, R is a fluoroalkylene group having from 1 to 6 carbons. In addition, the compound represented by Formula I may be a straight-chain or branched-chain compound.

Other Components

Examples of components other than the copolymer in the binder composition include dispersants such as surfactants and pH controlling agents. The surfactant may be a nonionic surfactant, a cationic surfactant, an anionic surfactant, or an amphoteric surfactant, and a plurality of types may be included.

The surfactant may be a surfactant used in polymerization, and those used in the related art in the polymerization of vinylidene polyfluoride, such as perfluorinated, partially fluorinated, and non-fluorinated surfactants, are preferably used. Of these, it is preferable to use perfluoroalkylsulfonic acid and salts thereof, perfluoroalkylcarboxylic acid and salts thereof, or fluorine-based surfactants having fluorocarbon chains or fluoropolyether chains, and it is more preferable to use perfluoroalkylcarboxylic acid and salts thereof.

Examples of pH controlling agents include electrolytic substances having a buffer capacity such as Na$_2$HPO$_4$, NaH$_2$PO$_4$, and KH$_2$PO$_4$, and sodium hydroxide.

Binder Composition Preparation Method

The binder composition can be obtained by synthesizing the copolymer described above with a known polymerization method. Examples of polymerization methods include emulsion polymerization and suspension polymerization.

Emulsion Polymerization

Emulsion polymerization is a type of radical polymerization and is a polymerization method performed by mixing a medium such as water and a monomer which is hardly soluble with the medium and an emulsifier (also called a "surfactant" hereafter), and then adding a polymerization initiator which is soluble in the medium to the mixture.

The surfactant may be a substance which can form micelles and can stably disperse the VDF component-containing copolymer that is produced at the time of emulsion polymerization. Examples of suitable surfactants serving as emulsifiers include known perfluorinated surfactants, partially fluorinated surfactants, and non-fluorinated surfactants that are used in the polymerization of polyvinylidene fluoride. Of these, it is preferable to use perfluoroalkylsulfonic acid and salts thereof, perfluoroalkylcarboxylic acid and salts thereof, or fluorine-based surfactants having fluorocarbon chains or fluoropolyether chains, and it is more preferable to use perfluoroalkylcarboxylic acid and salts thereof.

A water-soluble peroxide, a water-soluble azo compound, or a redox initiator may be used as a polymerization initiator. Examples of water-soluble peroxides include ammonium persulfate and potassium persulfate. Examples of water-soluble azo compounds include AIBN and AMBN. An example of a redox initiator is ascorbic acid-hydrogen peroxide. The polymerization initiator is preferably a water-soluble peroxide.

In addition, emulsion polymerization in this embodiment may be soap-free emulsion polymerization or mini-emulsion polymerization.

Soap-free emulsion polymerization may be performed by replacing the emulsifier used in the emulsion polymerization described above with a reactive emulsifier. A reactive emulsifier is a substance which has a polymerizable double bond in the molecule and acts as an emulsifier. When a reactive emulsifier is used, micelles are formed in the same manner as when the aforementioned emulsifier is present in the system in the initial stages of polymerization, but as the reaction progresses, the reactive emulsifier is consumed as a monomer. The reactive emulsifier is ultimately almost completely absent in the free state in the reaction system. A binder composition containing a copolymer obtained by soap-free emulsion polymerization is preferable in that there is the advantage that the emulsifier does not bleed out to the surface since the emulsifier does not remain in the polymer particles.

Examples of reactive emulsifiers include polyoxyalkylene alkenyl ethers, sodium alkylallylsulfosuccinate, sodium methacryloyloxy polyoxypropylene sulfonate esters, and alkoxy polyethylene glycol methacrylates, but the reactive emulsifier used in this embodiment is not particularly limited to these examples.

Note that when the monomers are dispersed, soap-free polymerization may also be performed without using a reactive emulsifier rather than soap-free emulsion polymerization.

Mini-emulsion polymerization is a method of performing polymerization by refining monomer oil droplets to a submicron size by applying a strong shearing force using an ultrasonic wave oscillator or the like. Mini-emulsion polymerization is performed by adding a hardly-soluble substance called a hydrophobe to stabilize the refined monomer oil droplets. In mini-emulsion polymerization, monomer oil droplets are ideally polymerized, and each oil droplet transforms into a fine particle of the VDF component-containing copolymer.

A latex containing a binder composition obtained by the method described above may be used directly as the binder dispersion liquid described below. Alternatively, a dispersion liquid obtained by dispersing agglomerates obtained by degrading a latex once again in a water-based medium using a surfactant may also be used as the binder dispersion liquid.
Suspension Polymerization Suspension polymerization is a method of dissolving an oil-soluble polymerization initiator in a water-insoluble monomer in water containing a stabilizer or the like, suspending and dispersing the mixture by mechanical stirring, and heating the mixture to perform polymerization in the monomer droplets. In suspension polymerization, polymerization progresses in the monomer droplets so that a dispersed solution of fine particles of a binder composition is obtained.

In suspension polymerization, substances which are oxidation/reduction resistant are preferable as the emulsifier and dispersant used in the production of the binder composition and the emulsifier and dispersant used to once again disperse the binder composition in water after recovering the binder composition as particles are preferable when taking into consideration the substances remaining inside the battery.

The production method for the binder composition is not particularly limited to the production methods described above, but emulsion polymerization, soap-free emulsion polymerization, or mini-emulsion polymerization is preferably used.
Binder Dispersion Liquid The binder dispersion liquid is a dispersion liquid containing a binder composition and a water-based solvent, and the binder dispersion liquid further contains a thickener in this embodiment. Further including a water-based solvent enables the adjustment of the solid content concentration.

The binder dispersion liquid in this embodiment preferably contains from 5 to 60 mass % of the copolymer described above and from 40 to 95 mass % of a water-based solvent, more preferably from 15 to 55 mass % of the copolymer described above and from 45 to 85 mass % of a water-based solvent, and even more preferably from 20 to 50 mass % of the copolymer described above and from 50 to 80 mass % of a water-based solvent with respect to the entire binder dispersion liquid. In addition, the binder dispersion liquid preferably contains a thickener in an amount of from 0.1 to 10 mass %, more preferably from 0.5 to 8 mass %, and even more preferably from 0.8 to 5 mass %.

Further, the binder dispersion liquid of this embodiment may also contain components other than a binder composition, a water-based solvent, and a thickener. Examples of such components include pH controlling agents, antisettling agents, surfactants, and wetting agents.

The binder dispersion liquid is a dispersion liquid in which the copolymer contained in the binder composition is dispersed in a water-based solvent. The copolymer is preferably dispersed uniformly in the water-based solvent. In addition, a portion of the copolymer may be dispersed in a water-based solvent, and a portion of the copolymer may be precipitated. The binder dispersion liquid may be prepared by adding and mixing a water-based solvent and a thickener in a binder composition or a latex containing a binder composition.
Water-Based Solvent The water-based solvent used in the binder dispersion liquid of this embodiment may be water or water containing a water-soluble solvent. Examples of water-soluble solvents include alcohol, acetone, and tetrahydrofuran (THF). In addition, examples of water used as a water-based solvent include purified water such as ion-exchanged water or distilled water, or tap water.

When water is used as the water-based solvent, a special drying apparatus or an apparatus for recovering an organic solvent is unnecessary. Thus, the cost efficiency is high and the amount of solvent to be discharged is small, which reduces the environmental burden.
Thickener A thickener has a thickening effect on the mixture of the binder composition and the water-based solvent. Examples of thickeners include but are not limited to carboxymethyl cellulose (CMC) and salts thereof, polyacrylic acid (PAA) and salts thereof, polyvinyl pyrrolidone (PVP), polyvinyl alcohol (PVA), and polyethylene oxide (PEO). CMC and salts thereof, PVA, and the like are preferable, and CMC and salts thereof are particularly preferable as thickeners from the perspective of the long-term chemical stability of the battery.

The binder dispersion liquid of the present invention ordinarily contains from 0.1 to 10 mass % of the binder composition, from 80 to 99.8 mass % of the water-based solvent, and from 0.1 to 10 mass % of the thickener, preferably from 0.5 to 8 mass % of the binder composition, from 84 to 99 mass % of the water-based solvent, and from 0.5 to 8 mass % of the thickener, and more preferably from 0.8 to 5 mass % of the binder composition, from 90 to 98.4 mass % of the water-based solvent, and from 0.8 to 5 mass % of the thickener per 100 mass % of the binder dispersion liquid.

In other words, the binder dispersion liquid refers to a fluid component excluding solid matter such as electrode active materials and conductive additives other than the binder composition from the mixture for a non-aqueous electrolyte secondary battery described next.

Mixture for Non-Aqueous Electrolyte Secondary Battery

The mixture for a non-aqueous electrolyte secondary battery in this embodiment (electrode mixture) contains the binder dispersion liquid described above and an electrode active material. The electrode active material may be either an active material for a negative electrode (called a "negative electrode active material" hereafter) or an active material for a positive electrode (called a "positive electrode active material" hereafter). Further, the mixture for a non-aqueous electrolyte secondary battery according to this embodiment may also contain a conductive additive. In addition, the mixture for a non-aqueous electrolyte secondary battery according to this embodiment may also contain a dispersion medium or a solvent other than a water-based solvent. Dispersion mediums and solvents other than a water-based solvent are called "non-aqueous solvents" hereafter.

Electrode Active Material

Of the electrode active materials, examples of negative electrode active materials include but are not limited to carbon materials, metal materials, alloy materials, and metal oxides. Of these, carbon materials are preferable as negative electrode active materials.

Artificial graphite, natural graphite, non-graphitizable carbon, graphitizable carbon, and the like may be used as carbon materials. Artificial graphite is obtained, for example, by carbonizing an organic material, performing heat treatment at a high temperature, and pulverizing and classifying the resulting mixture. The MAG series (available from Hitachi Chemical Co., Ltd.), MCMB (available from Osaka Gas Co., Ltd.), and the like may be used as artificial graphite. Non-graphitizable carbon can be obtained by firing a material derived from a petroleum pitch at 1000 to 1500° C. Carbotron P (available from Kureha Corporation) may be used as a non-graphitizable carbon. Using such a carbon material can increase the energy density of the battery. One type of carbon material may be used alone, or two or more types may be mixed and used.

The specific surface area of the negative electrode active material is preferably from 0.3 to 10 $m^2/g$ and more preferably from 0.6 to 6 $m^2/g$. When the specific surface area is not greater than 10 $m^2/g$, increases in the amount of degradation of the electrolyte solution are suppressed, and increases in the initial irreversible capacity can be suppressed. Among electrode active materials, a lithium-based positive electrode active material containing at least lithium is preferable as a positive electrode active material. Examples of lithium-based positive electrode active materials include composite metal chalcogen compounds represented by the general formula $LiMY_2$ (where M is at least one of a transition metal such as Co, Ni, Fe, Mn, Cr, or V, and Y is a chalcogen element such as O or S) such as $LiCoO_2$ or $LiNi_xCo_{1-x}O_2$ ($0<x\leq1$), composite metal oxides assuming a spinel structure such as $LiMn_2O_4$, and olivine-type lithium compounds such as $LiFePO_4$. A commercially available product may also be used as the positive electrode active material.

The specific surface area of the positive electrode active material is preferably from 0.05 to 50 $m^2/g$ and more preferably from 0.1 to 30 $m^2/g$.

Note that the specific surface area of the electrode active materials can be determined by a nitrogen adsorption method.

Conductive Additive

A conductive additive may be added as necessary at the time of the preparation of the mixture for a non-aqueous electrolyte secondary battery with the objective of imparting high conductivity between the electrode active materials or between the electrode active material and the current collector.

Examples of conductive additives that can be used include acetylene black, Ketjen black, carbon nanofibers, carbon nanotubes, and carbon fibers. Although the added amount of the conductive additive may vary depending on the type of the conductive additive that is used, a preferable ratio of the conductive additive that is added is from 0.1 to 15 wt. % (here, it is assumed that the amount of the electrode active material+the amount of the binder composition+the amount of the conductive additive=100 wt. %), more preferably from 0.1 to 7 wt. %, and particularly preferably from 0.1 to 5 wt. %. By setting the added amount to not less than 0.1 wt. %, the expected conductivity can be achieved, and by setting the added amount to not greater than 15 wt. %, the dispersion of the conductive additive in the mixture for a non-aqueous electrolyte secondary battery can be enhanced.

Non-Aqueous Solvent

The non-aqueous solvent is not particularly limited, but examples include acetone, dimethyl sulfoxide, ethyl methyl ketone, diisopropyl ketone, cyclohexanone, methyl cyclohexane, ethyl acetate, γ-butyrolactone, tetrahydrofuran, acetamide, N-methyl pyrrolidone, N,N-dimethylformamide, propylene carbonate, dimethyl carbonate, ethyl methyl carbonate, and diethyl carbonate. One type of non-aqueous solvent may be used alone, or two or more types may be mixed and used.

The dispersion medium of the mixture for a non-aqueous electrolyte secondary battery preferably contains a water-based solvent in an amount of not less than 50 mass %, more preferably not less than 70 mass %, even more preferably not less than 90 mass %, and particularly preferably not less than 95 mass % per total of the water-based solvent and the non-aqueous solvent. It is also preferable to use only a water-based solvent as a dispersion medium; that is, to use a water-based solvent in an amount of 100 mass %.

Other Components

The mixture for a non-aqueous electrolyte secondary battery according to this embodiment may also contain other components other than a binder composition, a thickener, an electrode active material, a conductive additive, a water-based solvent, and a non-aqueous solvent. Examples of other components include pigment dispersants such as polyvinyl pyrrolidone, and adhesive adjuvants such as polyacrylic acid and polymethacrylic acid.

In addition, the other components may include polymers other than the copolymer described above. Examples of other polymers include polytetrafluoroethylene (PTFE), styrene/butadiene rubber (SBR), and polyacrylonitrile (PAN). When another polymer is contained in the mixture for a non-aqueous electrolyte secondary battery of this embodiment, the other polymer is contained in an amount of not greater than 25 parts by mass per 100 parts by mass of the binder composition.

Composition

In the mixture for a non-aqueous electrolyte secondary battery according to this embodiment, the content of the binder composition is preferably from 0.2 to 15 parts by mass and more preferably from 0.5 to 10 parts by mass per total of 100 parts by mass of the binder composition and the electrode active material. On the other hand, the content of the electrode active material is preferably from 85 to 99.8 parts by mass and more preferably from 90 to 99.5 parts by mass. When a conductive additive is contained, the content of the conductive additive is preferably from 0.5 to 15 parts by mass, even more preferably from 0.5 to 7 parts by mass, and particularly preferably from 0.5 to 5 parts by mass when the total of the binder composition, the electrode active material, and the conductive additive is defined as 100 parts by mass. When the total of the binder composition, the electrode active material, and the conductive additive is defined as 100 parts by mass, the water content is preferably from 20 to 300 parts by mass and more preferably from 50 to 200 parts by mass. Similarly, when the total of the binder composition, the electrode active material, and the conductive additive is defined as 100 parts by mass, the content of the thickener is preferably from 0.1 to 10 parts by mass and more preferably from 0.1 to 5 parts by mass. By containing each component in the range described above, the adhesive strength between the electrode mixture layer and the current collector is excellent when an electrode for a non-aqueous electrolyte secondary battery is produced using the mixture for a non-aqueous electrolyte secondary battery according to this embodiment.

The method for obtaining the mixture for a non-aqueous electrolyte secondary battery according to this embodiment is not particularly limited, but the mixture may be obtained by adding and mixing a thickener and an electrode active material into the binder composition described above, or the mixture may be obtained by adding and mixing an electrode active material into the binder dispersion liquid described above.

Electrode for Non-Aqueous Electrolyte Secondary Battery

The electrode for a non-aqueous electrolyte secondary battery (electrode) according to this embodiment includes an electrode mixture layer formed from the mixture for a non-aqueous electrolyte secondary battery described above on a current collector. The electrode mixture layer need only be formed on at least one side of the current collector, and is preferably formed on both sides of the current collector.

Current Collector

An example of a current collector used to obtain a negative electrode for a non-aqueous electrolyte secondary battery is copper. In addition, examples of the shape thereof include a metal foil and a metal mesh. To obtain a negative electrode for a non-aqueous electrolyte secondary battery, it is preferable to use a copper foil. An example of a current collector used to obtain a positive electrode for a non-aqueous electrolyte secondary battery is aluminum. Examples of the shape thereof include a metal foil and a metal mesh. To obtain a positive electrode for a non-aqueous electrolyte secondary battery, it is preferable to use an aluminum foil.

The thickness of the current collector is preferably from 5 to 100 µm and more preferably from 5 to 20 µm.

Electrode Mixture Layer

The thickness of the electrode mixture layer is, in the case of a positive electrode, preferably from 40 to 500 µm and more preferably from 100 to 400 µm. In the case of a negative electrode, the thickness is preferably from 20 to 400 µm and more preferably from 40 to 300 µm. The basis weight of the electrode mixture layer is preferably from 20 to 700 g/m$^2$ and more preferably from 30 to 500 g/m$^2$.

The electrode mixture layer can be formed by coating a current collector with a mixture for a non-aqueous electrolyte secondary battery and drying the mixture. The coating method is not particularly limited, but examples include methods of coating with a bar coater, a die coater, or a comma coater. The drying which follows coating is ordinarily performed for 1 to 300 minutes at a temperature from 50 to 150° C. The pressure in the drying is not particularly limited, but drying is ordinarily performed under atmospheric pressure or reduced pressure. Heat treatment may be further performed after drying. When heat treatment is performed, heat treatment is ordinarily performed for 10 seconds to 300 minutes at a temperature from 100 to 300° C. The temperature of heat treatment overlaps with that of the drying described above, but these processes may be separate processes or processes performed consecutively.

Press treatment may also be performed after coating and drying in the formation of the electrode mixture layer. When press treatment is performed, press treatment is ordinarily performed at 1 to 200 MPa. By performing press treatment, the electrode density can be enhanced.

An electrode for a non-aqueous electrolyte secondary battery can be produced by the method described above. The layer structure of an electrode for a non-aqueous electrolyte secondary battery is a two-layer structure including an electrode mixture layer/current collector in a case where the mixture for a non-aqueous electrolyte secondary battery is applied to one surface of the current collector, and is a three-layer structure with a current collector sandwiched between electrode mixture layers in a case where the electrode mixture layer for a non-aqueous electrolyte secondary battery is applied to both surfaces of the current collector.

Using the electrode for a non-aqueous electrolyte secondary battery according to this embodiment achieves the effect of making it possible to provide a safe non-aqueous electrolyte secondary battery.

Non-Aqueous Electrolyte Secondary Battery

The non-aqueous electrolyte secondary battery of this embodiment is not particularly limited with the exception of having the aforementioned electrode for a non-aqueous electrolyte secondary battery. Specifically, the electrode for a non-aqueous electrolyte secondary battery may have at least one of a positive electrode for a non-aqueous electrolyte secondary battery and a negative electrode for a non-aqueous electrolyte secondary battery. Known materials may be used for members other than the electrodes for a non-aqueous electrolyte secondary battery such as a separator and a non-aqueous electrolyte, for example.

Summary

The binder composition according to the present invention contains a copolymer including monomer units derived from vinylidene fluoride, a fluorine-containing alkyl vinyl compound, and a crosslinkable monomer; the content of the monomer unit derived from the fluorine-containing alkyl vinyl compound in the copolymer being not less than 2 mass % and less than 10 mass %; and the content of the monomer unit derived from the crosslinkable monomer being less than 5 mass %.

In addition, in the binder composition according to the present invention, the crosslinkable monomer is preferably perfluorodivinyl ether or perfluoroalkylene divinyl ether.

Further, in the binder composition according to the present invention, the fluorine-containing alkyl vinyl compound is preferably hexafluoropropylene, tetrafluoroethylene, or chlorotrifluoroethylene.

In addition, in the binder composition according to the present invention, the copolymer is preferably a ternary copolymer containing monomer units including vinylidene fluoride, a fluorine-containing alkyl vinyl compound, and a crosslinkable monomer.

Further, a binder dispersion liquid containing the binder composition according to the present invention and a water-based solvent and an electrode mixture containing the binder dispersion liquid and an electrode active material are also included in the present invention.

In addition, an electrode in which a layer formed from the electrode mixture according to the present invention is disposed on a current collector and a non-aqueous electrolyte secondary battery including this electrode are also included in the present invention.

The method for producing a binder composition according to the present invention is a method for producing a binder composition for binding an electrode active material to a current collector; the binder composition containing a copolymer including monomer units derived from vinylidene fluoride, a fluorine-containing alkyl vinyl compound, and a crosslinkable monomer; and the method including producing the copolymer using the fluorine-containing alkyl vinyl compound in an amount of not less than 2 parts by mass and less than 10 parts by mass and the crosslinkable monomer in an amount of less than 5 parts by mass when the total amount of the monomers used in the production of the copolymer is defined as 100 parts by mass.

Embodiments of the present invention will be described in further detail hereinafter using examples. The present invention is not limited to the examples below, and it goes without saying that various aspects are possible with respect to the details thereof. Furthermore, the present invention is not limited to the embodiments described above, and various modifications are possible within the scope indicated in the claims. Embodiments obtained by appropriately combining the technical means disclosed by the embodiments are also included in the technical scope of the present invention. In addition, all of the documents disclosed in the present specification are hereby incorporated by reference.

EXAMPLES

Binder Composition Preparation

First, 0.2 parts by mass of sodium hydrogen phosphate ($Na_2HPO_4$) and 330 parts by mass of water were placed in an autoclave, and after degassing, 1 part by mass of an ammonium salt of perfluorooctanoic acid (PFOA), 0.25 parts by mass of ethyl acetate and 26.7 parts by mass of vinylidene fluoride (VDF) were added, followed by 8 parts by mass of hexafluoropropylene (HFP).

After the mixture was heated to 80° C. with stirring, 0.06 parts by mass of ammonium persulfate (APS) was added, and polymerization started. The initial pressure at this time was 3.5 MPa. At the point when the pressure dropped to 2.5 MPa, 2 parts by mass of perfluorodivinyl ether (PEVE) was added, and 63.3 parts by mass of VDF was then added continuously so that this pressure was maintained. When the pressure dropped to 1.5 MPa, the polymerization reaction ended, and a VDF/HFP/PEVE copolymer latex in which a binder composition was dispersed in water was obtained.

Preparation of CMC Aqueous Solution

A CMC aqueous solution was obtained by dissolving carboxymethyl cellulose (CMC) (Cellogen 4H, available from Daiichi Kogyo Seiyaku Co., Ltd.) while heating. The CMC aqueous solution was dried for 2 hours at 150° C., and the CMC concentration of the CMC aqueous solution was determined from the weight of the CMC after drying and the weight of the CMC aqueous solution. The CMC concentration was 1.5 wt. %.

Peeling Test

BTR518 (natural graphite, available from BTR), a VDF/HFP/PEVE copolymer latex, an aqueous solution containing 1.5% CMC, and water were kneaded using a Rentaro (Thinky Corporation) to produce a mixture for a non-aqueous electrolyte secondary battery in the form of a slurry. The prepared slurry was applied to copper foil, and the slurry was dried for 30 minutes under conditions in a nitrogen atmosphere of 80° C. using a high-temperature constant temperature device (HISPEC HT310S, available from Kusumoto Chemicals, Ltd.). Furthermore, drying was performed for 2 hours at 150° C. to obtain a dry electrode. The dry electrode was pressed at 1.2 MPa to obtain a compacted electrode.

Gummed tape was attached to the coating electrode surface using a Tensilon (STA-1150 available from Orientic Co., Ltd.), and a 180° peel test was performed at a head speed of 200 mm/min in accordance with JIS K-6854 using Cu foil as a "flexible adherend" to evaluate the peel strength.

Swelling Test

A pressed sheet with a thickness of 150 μm was produced from the binder composition at 200° C. using a compression molding machine (available from Shinto Metal Industries Corporation). Samples were prepared by cutting out two 4 cm×2 cm sample pieces from the produced pressed sheet. The prepared samples were placed in a sample vial containing an electrolyte solution (1.2 mol/L/min $LiPF_6$EC: EMC=3:7 (vol %), available from Kishida Chemical Co., Ltd.), and n=2 of each sample was left to stand in an oven (60° C.). The weight change rate was calculated based on the weight of the recovered sample to determine the swelling ratio.

Example 1

As described above (Binder composition preparation), a VDF/HFP/PEVE copolymer latex containing 90 parts by mass of VDF, 8 parts by mass of HFP, and 2 parts by mass of PEVE was obtained. An electrode for a non-aqueous electrolyte secondary battery was produced using the obtained copolymer latex, and the peel strength and swelling were tested.

Example 2

A VDF/HFP/PEVE copolymer latex containing 91 parts by mass of VDF, 8 parts by mass of HFP, and 1 part by mass of PEVE was obtained. Evaluations were otherwise made in the same manner as in Example 1.

Example 3

A VDF/HFP/PEVE copolymer latex containing 91.7 parts by mass of VDF, 8 parts by mass of HFP, and 0.3 parts by mass of PEVE was obtained. Evaluations were otherwise made in the same manner as in Example 1.

Example 4

A VDF/HFP/PEVE copolymer latex containing 94 parts by mass of VDF, 5 parts by mass of HFP, and 1 part by mass of PEVE was obtained. Evaluations were otherwise made in the same manner as in Example 1.

Example 5

A VDF/HFP/PEVE copolymer latex containing 89 parts by mass of VDF, 8 parts by mass of HFP, and 3 parts by mass of PEVE was obtained. Evaluations were otherwise made in the same manner as in Example 1.

Comparative Example 1

A VDF/HFP/PEVE copolymer latex containing 89 parts by mass of VDF, 10 parts by mass of HFP, and 1 part by mass of PEVE was obtained. Evaluations were otherwise made in the same manner as in Example 1.

Comparative Example 2

A VDF/HFP/PEVE copolymer latex containing 87 parts by mass of VDF, 8 parts by mass of HFP, and 5 parts by mass of PEVE was obtained. Evaluations were otherwise made in the same manner as in Example 1.

Comparative Example 3

A VDF/HFP copolymer latex containing 86 parts by mass of VDF and 14 parts by mass of HFP was obtained. Evaluations were otherwise made in the same manner as in Example 1.

Comparative Example 4

A VDF homopolymer (PVDF) latex containing 100 parts by mass of VDF was obtained. Evaluations were otherwise made in the same manner as in Example 1.

The results for each of the examples and each of the comparative examples are shown in Table 1. Note that the peel strength is expressed as a relative value using the value in Comparative Example 3 as 100.

TABLE 1

| | VDF/HFP/PEVE (wt. %) | Peel strength (Relative value) | Swelling ratio (wt. %) |
|---|---|---|---|
| Example 1 | 90/8/2 | 149 | 69.2 |
| Example 2 | 91/8/1 | 164 | 56.1 |
| Example 3 | 91.7/8/0.3 | 146 | 55.7 |
| Example 4 | 94/5/1 | 130 | 33.8 |
| Example 5 | 89/8/3 | 128 | 47.3 |
| Comparative Example 1 | 89/10/1 | 60 | 89.0 |
| Comparative Example 2 | 87/8/5 | 98 | 95.3 |
| Comparative Example 3 | 86/14 | 100 | 230.2 |
| Comparative Example 4 | 100 | 49 | 14.7 |

INDUSTRIAL APPLICABILITY

The present invention can be suitably used as a binder for a safe non-aqueous electrolyte secondary battery.

The invention claimed is:

1. A binder composition for binding an electrode active material to a current collector,
the binder composition comprising:
a copolymer including monomer units derived from vinylidene fluoride;
hexafluoropropylene; and
a crosslinkable monomer;
a content of the monomer unit derived from the hexafluoropropylene in the copolymer being not less than 3 mass % and not greater than 9 mass %, and
a content of the monomer unit derived from the crosslinkable monomer being not less than 0.1 mass % to less than 5 mass %;
wherein the crosslinkable monomer is perfluorodivinyl ether or perfluoroalkylene divinyl ether.

2. The binder composition according to claim 1, wherein the copolymer is a ternary copolymer containing monomer units including vinylidene fluoride, a fluorine-containing alkyl vinyl compound, and a crosslinkable monomer.

3. A binder dispersion liquid comprising the binder composition according to claim 1 and a water-based solvent.

4. An electrode mixture comprising the binder dispersion liquid according to claim 3 and an electrode active material.

5. An electrode comprising a layer formed from the electrode mixture according to claim 4 on a current collector.

6. A non-aqueous electrolyte secondary battery comprising the electrode according to claim 5.

7. A method for producing a binder composition for binding an electrode active material to a current collector, the binder composition containing a copolymer including monomer units derived from vinylidene fluoride, hexafluoropropylene, and a crosslinkable monomer, the method comprising
producing the copolymer using the hexafluoropropylene in an amount of not less than 3 parts by mass and not greater than 9 parts by mass and the crosslinkable monomer in an amount of not less than 0.1 parts by mass to less than 5 parts by mass when a total amount of the monomers used in the production of the copolymer is defined as 100 parts by mass;
wherein the crosslinkable monomer is perfluorodivinyl ether or perfluoroalkylene divinyl ether.

8. The binder composition according to claim 1, wherein the content of the monomer unit derived from the crosslinkable monomer is 0.3 mass % to less than 5 mass %.

9. The method according to claim 7, wherein the crosslinkable monomer is in an amount of 0.3 parts by mass to less than 5 parts by mass.

* * * * *